United States Patent [19]

Adams et al.

[11] 4,129,699

[45] Dec. 12, 1978

[54] PROCESS FOR THE HYDROHALOGENATION OF BUTA-DIENE-CONTAINING POLYMERS

[75] Inventors: Harold E. Adams, Cuyahoga Falls; Stephen P. Boutsicaris, Akron; Adel F. Halasa, Bath, all of Ohio

[73] Assignee: The Firestone Tire & Rubber Company, Akron, Ohio

[21] Appl. No.: 827,506

[22] Filed: Aug. 25, 1977

[51] Int. Cl.$^2$ .............................................. C08F 8/18
[52] U.S. Cl. .................................... 526/42; 526/52.1
[58] Field of Search ................................. 526/42, 52.1

[56] References Cited

U.S. PATENT DOCUMENTS

| | | | |
|---|---|---|---|
| 2,596,878 | 5/1952 | van Veersen | 260/771 |
| 3,454,541 | 7/1969 | Orr et al. | 526/42 |
| 3,647,774 | 3/1972 | Webb et al. | 526/42 |
| 3,947,432 | 3/1976 | Tsuchiya et al. | 526/42 |

FOREIGN PATENT DOCUMENTS 922373  3/1963  United Kingdom.

*Primary Examiner*—William F. Hamrock

[57] ABSTRACT

Disclosed is a novel process for the hydrohalogenation of polybutadiene and butadiene-containing copolymers in the presence of aqueous hydrogen halides. The process permits the hydrohalogenation of from about 1 to about 50% of the carbon-carbon double bonds of the polybutadiene chain and includes the steps of dissolving the polymer in a suitable organic solvent containing a catalytic amount of a quaternary ammonium salt, adding an aqueous hydrogen halide, mixing the reactants and thereafter extracting the hydrohalogenated product.

10 Claims, No Drawings

PROCESS FOR THE HYDROHALOGENATION OF BUTA-DIENE-CONTAINING POLYMERS

BACKGROUND OF THE INVENTION

The present invention relates to the hydrohalogenation of polybutadiene and butadiene-containing copolymers via aqueous hydrogen halides. The addition of hydrogen halide gases to unsaturated polymers is generally known wherein hydrogen is added to one carbon of an olefinic group and the halogen is added to the other.

DESCRIPTION OF THE PRIOR ART

One U.S. patent of which we are aware, U.S. Pat. No. 2,596,878, discloses the hydrohalogenation of stabilized aqueous dispersions of natural rubber utilizing hydrogen halide gas. The stabilizers are employed to prevent coagulation of the latex upon addition of the hydrogen halide and include cationic soaps, cation active compounds and nonionic emulsifying agents. The patentee notes an advantage of his process over known prior art in that his does not require the use of rubber solvents which are not only themselves costly but also time-consuming to remove. Considering the structure of the natural rubber molecular, comprising the isoprene group,

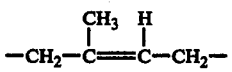

the reaction has long been understood to proceed by the addition of the halogen to the tertiary olefinic carbon with the hydrogen bonding to its mate as follows:

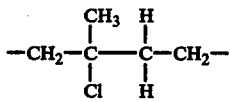

A British Pat. No. 922,373, exists which does disclose a process for the hydrochlorination of butadiene-containing polymers to produce products having chlorine contents of up to 28-30% by weight. The preferred reaction is conducted with dry hydrogen chlorine gas, acting upon the polymer composition in a suitable rubber solvent under a pressure of from 0-35 atmospheres and in the presence of from 0-100% of a Friedel-Crafts catalyst, e.g., $SnCl_4$, $TiCl_4$, $AlCl_3$, and the like. The patent reports the known, unsuccessful attempts to hydrochlorinate polybutadiene with hydrogen chlorine gas without a rubber solvent and with liquid hydrogen chlorine under any conditions.

Thus, a process for the direct hydrohalogenation of polybutadiene or butadiene-containing polymers with aqueous hydrogen halides is not known to us. Such a process would be useful inasmuch as the aqueous hydrogen halides are generally more conveniently employed than the gaseous form. Usefulness of the resulting halogenated polymers is presently well-known and need not be repeated herein.

SUMMARY OF THE INVENTION

It is therefore an object of the present invention to provide a process for the hydrohalogenation of polybutadiene and butadiene-containing polymers to produce useful halogenated polymers.

It is another object of the present invention to provide a process for the hydrohalogenation of butadiene-containing polymers by the use of aqueous hydrogen halides.

It is yet another object of the present invention to provide a process for the hydrohalogenation of butadiene-containing polymers containing controlled amounts of halogen atoms in the chain, e.g., hydrohalogenation of up to 50% of the olefinic bonds.

It is still another object of the present invention to provide a process for the hydrohalogenation of butadiene-containing polymers utilizing the catalytic effect of quaternary ammonium compounds.

These and other objects of the present invention shall become apparent from the specification and claims which follows.

In general, a process for the hydrohalogenation of butadiene-containing polymers, hereinafter used to designate polybutadiene and butadiene copolymers, includes the steps of dissolving the butadiene-containing polymer in a suitable organic solvent in the presence of a catalytic amount of a quaternary ammonium salt, adding an aqueous hydrogen halide HX, wherein the X can be fluorine, chlorine, bromine or iodine and, mixing the reactants to form the hydrohalogenated product. After the reaction has been completed the desired product is extracted via conventional methods.

DESCRIPTION OF THE PREFERRED EMBODIMENT

The butadiene-containing polymers which can be hydrohalogenated according to the process of the present invention include those which are generally copolymerizable therewith such as the monovinyl aromatics, e.g., styrene and acrylonitrile, as well as polybutadiene itself. Polymerization of the butadiene-containing polymer can be carried out in any convenient manner and does not form a part of the present invention. Similarly, number average molecular weight of the polymer, which can range from about 1,000 to 1,000,000, will be selected on the basis of the desired halogenated product. And, butadiene copolymers can have from 1 to about 99% by weight of polybutadiene. Generally, all that is necessary is that the polymer to be halogenated contain olefinic unsaturation.

After selection of the polymer has been made, it is then dissolved in a suitable solvent such as chlorobenzene. Alternatively, benzene, alkyl halides or alkylaromatic compounds could be employed. In order for the hydrohalogenation reaction to proceed, it is necessary to employ as a catalyst a quaternary ammonium compound. Compounds having the general formula $(R_4N)X$, wherein the R is selected from the group consisting of alkyl groups having from 1 to about 20 carbon atoms, aryl groups having from 6 to about 12 carbon atoms and mixtures thereof, and X is a halogen selected from the group consisting of fluorine, chlorine, bromine and iodine, have been found to be satisfactory, with tetraethyl ammonium chloride being preferred. Other exemplary compounds which can be employed include tetramethyl ammonium bromide, tetraphenyl ammonium bromide, tetra-p-ethylphenyl ammonium bromide, phenyl trimethyl ammonium chloride and triphenyl ethyl ammonium bromide. It should be understood that selection of a particular catalyst can readily be made by those skilled in the art from the groups listed and that the disclosure provided herein is not to be construed as limiting. Amounts of the desired catalyst to be added are from about 2 to 70% by weight.

Hydrohalogenation is accomplished with a concentrated aqueous hydrogen halide HX wherein the X can be fluorine, chlorine, bromine or iodine. The concentrated acid is added to the reaction vessel containing dissolved polymer and catalyst and is thereafter mixed for a period of time of at least 48 hours. Temperature of the reaction vessel can be maintained between about 50° and 150° C. with 80° C. being preferred. Upon completion of the hydrohalogenation, the acid is neutralized with a suitable base and the product is recovered via suitable methods.

In the examples which follow, Duradene HX-510 (a copolymer of butadiene 77% by weight and styrene 23% by weight) and Diene-35 (polybutadiene) were hydrochlorinated according to the process of the present invention. (Duradene is a registered trademark of the Firestone Synthetic Rubber and Latex Co.) Examples 1-9 are presented in Table I, wherein Duradene HX-510 and Diene-35 were hydrochlorinated in the presence of different solvents and different catalysts. Reaction temperatures were maintained at 80° C. with the exception of example 7 (30° C). Reaction times were all 120 hours. Chlorine content, in terms of weight percent, dilute solution viscosity (DSV) determined in tetrahydrofuran (THF), percent gel, and color of the product for examples 1-9 are presented in Table II. Examples 10-16 are presented in Table III, wherein Duradene HX-510 and Diene-35 were hydrochlorinated in the presence of chlorobenzene and tetraethyl ammonium chloride (Et)$_4$NCl. Here, the amounts of HCl and (Et)$_4$NCl were varied as was the reaction time. Reaction temperature was maintained at 80° C. In Table IV, product characteristics for examples 10-16 are again reported and, in addition, the solubility in THF. It is to be understood that the examples are representative of the present invention and are intended to illustrate the results achieved in the practice of our invention.

Each of the examples 1-16 was run as follows unless otherwise noted in the Tables. In a reaction vessel containing 300 cc of the solvent and 3-6 gms of the quaternary ammonium salt approximately 9 gms of the butadiene polymer was dissolved. 100-300 cc of concentrated HCl was added as the aqueous hydrogen halide and the mixture was thereafer tumbled for 96-168 hours at 80° C. Extraction of the reaction product was begun first, by separation of the solvent layer, followed by its neutralization with ammonium hydroxide and lastly, its precipitation with methanol.

TABLE I

| Ingredients: | 1 | 2 | 3 | 4 | 5 | 6 | 7 | 8 | 9 |
|---|---|---|---|---|---|---|---|---|---|
| Duradene (HX-150) gms. | 9 | 9 | 9 | 9 | 9 | 9 | 9 | 9 | — |
| Diene - 35 gms. | — | — | — | — | — | — | — | — | 9 |
| Conc. HCl cc. | 300 | 300 | 300 | 300$^a$ (1N) | 300 | 300 | 300 | 300 | 300 |
| Chlorobenzene cc. | 300 | 300 | 300 | 300 | 300 | 300 | 300 | — | 300 |
| Benzene, cc. | — | — | — | — | — | — | — | 300 | — |
| Cetyltrimethyl NBr gms. | 6 | — | — | — | — | — | — | — | — |
| (Et)$_4$NBr gms. | — | 6 | — | — | — | — | — | — | — |
| (Et)$_4$NCl, gms. | — | — | 6 | 6 | 12 | 30 | 6 | 6 | 6 |

$^a$One Normal HCl used.

TABLE II

| | 1 | 2 | 3 | 4 | 5 | 6 | 7 | 8 | 9 |
|---|---|---|---|---|---|---|---|---|---|
| Chlorine content % by wt. | 4.26 | 4.11 | 5.13 | N.R. | 4.98 | 4.34 | 0.16 (a) | 2.52 | (b) |
| DSV (in THF) | 1.73 | 1.38 | 1.73 | — | 1.47 | 1.75 | 2.26 | 1.83 | — |
| Gel % | 0.0 | 5.23 | 0.0 | 2.6 | 0.0 | 0.0 | 0.0 | 0.0 | — |
| Color of Product | Light Brown | Dark | Brown | — | Brown | Brown | Light | Light Brown | Light Brown |

(a) Reaction temperature 30° C.
(b) Product obtained, accidentally destroyed prior to evaluation.

TABLE III

| Ingredients: | 10 | 11 | 12 | 13 | 14 | 15 | 16 |
|---|---|---|---|---|---|---|---|
| Duradene HX-510 gms. | — | 9 | 9 | 9 | 9 | 9 | 9 |
| Diene-35 gms. | 9 | — | — | — | — | — | — |
| Chlorobenzene cc. | 250 | 250 | 250 | 250 | 250 | 250 | 250 |
| Conc. HCl, cc. | 200 | 200 | 200 | 200 | 100 | 100 | 100 |
| (Et)$_4$NCl, gms. | 3 | 3 | 3 | 6 | 3 | 3 | 6 |
| Reaction Time (hours) | 96 | 96 | 168 | 96 | 96 | 168 | 168 |

TABLE IV

| | 10 | 11 | 12 | 13 | 14 | 15 | 16 |
|---|---|---|---|---|---|---|---|
| Chlorine content % by wt. | 1.60 | 3.64 | 4.40 | 4.12 | 2.00 | 3.54 | 2.80 |
| DSV (in THF) | 1.61 | 1.78 | 1.85 | 1.88 | 1.49 | 1.65 | 1.57 |
| % gel (2 weeks old) | 0.0 | 0.0 | 0.0 | 3.49 | 1.05 | 1.79 | 2.13 |
| Color of Product | Light | Light Brown | Light Brown | Light Brown | Light Brown | Dark Brown | Light Brown |
| Solubility in THF | sol. | sol. | sol. | | | | |
| Solubility in THF after 2 months of storage | sl. | sl. | sol. | | | | |

TABLE IV-continued

| | Example No.: | | | | | |
|---|---|---|---|---|---|---|
| 10 | 11 | 12 | 13 | 14 | 15 | 16 |
| insol. | insol. | | | | | |

From examples 1–3 in Table II, it can be seen that all three catalysts enabled the hydrochlorination reaction to proceed and, that reasonably high chlorine levels, for this process, were obtained. In example 4, the reaction did not take place because 1 normal HCl was utilized in lieu of the concentrated acid. Examples 5 and 6, indicated that increasing the amount of the tetraethyl ammonium chloride by factors of two and five did not effect the chlorine content. Example 7 had a very low chlorine content due to the lower reaction temperature of 30° C. Example 8 indicated that the solvent benzene worked, but yielded a lower chlorine content than chlorobenzene. Example 9 has not been reported because the product obtained was inadvertantly destroyed prior to evaluation.

From examples 10–12 in Table IV, it can be seen that lowering the amounts of HCl and tetraethyl ammonium chloride lowered the chlorine content of the resultant product, but did not otherwise effect the reaction. Chlorine content for example 10, the hydrochlorination of polybutadiene, was significantly lower than that found for the reactions of Duradene. In examples 13–16, the amounts of HCl were varied from 200 to 100 cc, the amount of catalyst was 3 to 6 gms. and the reaction time was increased from 4 days to 7. While hydrochlorination of all four products was obtained, gelling was also observed, after the work up to isolate and purify the product, making the products useless; for this reason solubilities were not attempted.

Addition of the hydrogen and chlorine, or other selected halogen, is made to the olefinic groups —C═C— of the butadiene to yield the structure:

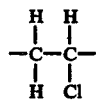

Unlike the direct halogenation of these polymers, which would add a halogen atom to both sides of the double bond, or a process such as described in U.S. Pat. No. 2,596,878, which allows for the hydrohalogenation of substantially all of the double bonds, by employing the process set forth herein a milder, more controlled addition of halogen to the double bonds may be facilitated. Thus, the process is useful wherein up to about 50% of the available carbon-carbon double bonds of the polybutadiene chain are to be hydrohalogenated.

Thus, it can be seen that the disclosed invention carries out the objects of the invention set forth above. As will be apparent to those skilled in the art, the preceding examples can be varied by the selection of the various ingredients as well as the amounts thereof according to the foregoing specification, and it is believed that the preparation and use of these can be determined to achieve substantially the same results without departing from the spirit of the invention herein disclosed and described, the scope of the invention being limited solely by the scope of the attached claims.

We claim:

1. A process for the hydrohalogenation of butadiene-containing polymer comprising the steps of:
dissolving the butadiene-containing polymer in a suitable organic solvent containing a catalytic amount of a quaternary ammonium salt having the formula $(R_4N)X$ wherein R is selected from the group consisting of alkyl groups having from 1 to about 20 carbon atoms, aryl groups having from 6 to about 12 carbon atoms and mixtures thereof, and X is selected from the group consisting of fluorine, chlorine, bromine and iodine;
adding an aqueous hydrogen halide having the formula HX wherein X is selected from the group consisting of fluorine, chlorine, bromine and iodine;
mixing the reactants for a period of time of at least about 48 hours at a temperature of about 50° to 150° C.; and,
thereafter terminating the reaction and extracting the hydrohalogenated product.

2. A process for hydrohalogenation, as set forth in claim 1, wherein said butadiene-containing polymer is selected from the group consisting of polybutadiene and copolymers thereof with styrene and acrylonitrile; and
wherein said organic solvent is selected from the group consisting of chlorobenzene, benzene, alkyl halides and alkylaromatic compounds.

3. A process for hydrohalogenation, as set forth in claim 2, wherein said butadiene-containing polymer is a copolymer of butadiene and styrene;
wherein said solvent is chlorobenzene; and,
wherein said quaternary ammonium salt is tetraethyl ammonium chloride.

4. A process for hydrohalogenation, as set forth in claim 3, wherein said hydrogen halide is hydrogen chloride.

5. A process for hydrohalogenation, as set forth in claim 4, wherein from about 1 to about 50% of the carbon-carbon double bonds of the polybutadiene chain are hydrohalogenated.

6. A process for the hydrohalogenation of butadiene-containing polymer comprising the steps of:
dissolving the butadiene-containing polymer in a suitable organic solvent containing a catalytic amount of a quaternary ammonium salt having the formula $(R_4N)X$ wherein R is selected from the group consisting of alkyl groups having from 1 to about 20 carbon atoms, aryl groups having from 6 to about 12 carbon atoms and mixtures thereof, and X is selected from the group consisting of fluorine, chlorine, bromine and iodine;
adding an aqueous hydrogen halide having the formula HX wherein X is selected from the group consisting of fluorine, chlorine; bromine and iodine;
mixing the reactants for a period of time of at least about 48 hours at a temperature of about 80° C.; and,
thereafter terminating the reaction and extracting the hydrohalogenated product.

7. A process for hydrohalogenation, as set forth in claim 6, wherein said butadiene-containing polymer is selected from the group consisting of polybutadiene and copolymers thereof with styrene and acrylonitrile; and wherein said organic solvent is selected from the group consisting of chlorobenzene, benzene, alkyl halides and alkylaromatic compounds;

mixing the reactants for a period of time of at least about 48 hours at a temperature of about 50° to 150° C.; and, thereafter terminating the reaction and extracting the hydrohalogenated product.

8. A process for hydrohalogenation, as set forth in claim 6, wherein said butadiene-containing polymer is a copolymer of butadiene and styrene;

wherein said solvent is chlorobenzene; and, wherein said quaternary ammonium salt is tetraethyl ammonium chloride.

9. A process for hydrohalogenation, as set forth in claim 8, wherein said hydrogen halide is hydrogen chloride.

10. A process for hydrohalogenation, as set forth in claim 9, wherein from about 1 to about 50% of the carbon-carbon double bonds of the polybutadiene chain are hydrohalogenated.

* * * * *